United States Patent [19]
Hsieh

[11] Patent Number: 6,045,111
[45] Date of Patent: Apr. 4, 2000

[54] FIXING SUCKER STRUCTURE

[75] Inventor: Tsung-Hsi Hsieh, Changhua, Taiwan

[73] Assignee: Chien Lu Hardware Co., Ltd., Changhua, Taiwan

[21] Appl. No.: 09/131,702

[22] Filed: Aug. 10, 1998

[51] Int. Cl.[7] .................................................. F16M 13/00
[52] U.S. Cl. ........................ 248/551; 248/205.8; 248/362; 248/503
[58] Field of Search .................................. 248/551, 205.8, 248/205.5, 206.2, 362, 363, 309.3, 503, 553; 160/370.21, 370.22, 370.23, DIG. 13; 296/97.7

[56] References Cited

U.S. PATENT DOCUMENTS

| | | | |
|---|---|---|---|
| 4,133,575 | 1/1979 | Mader | 248/206.2 X |
| 5,031,865 | 7/1991 | Blattner | 248/205.8 X |
| 5,909,758 | 6/1999 | Kitamura | 248/205.8 X |

FOREIGN PATENT DOCUMENTS

| | | | |
|---|---|---|---|
| 813265 | 5/1959 | United Kingdom | 248/205.8 |

*Primary Examiner*—Ramon O. Ramirez
*Assistant Examiner*—Stephen S. Wentsler
*Attorney, Agent, or Firm*—Browdy and Neimark

[57] ABSTRACT

A fixing sucker structure including a movable handle, a sucker main body, a controlling inner tube fitted in a tube body of top end of the sucker main body, a lifting thread rod positioned in the sucker main body and screwed with the controlling inner tube and a disc-like enlarged section connected with the bottom end of the lifting thread rod. The circumference of the enlarged section is formed with annular grooves in which soft gaskets are fitted. A gasket with U-shaped cross-section is fitted with the bottom edge of the sucker main body. When the movable handle is rotated, the controlling inner tube is driven to rotate so as to micro-adjust and drive the lifting thread rod to move upward or downward within the sucker main body, creating a vacuum state therein and producing a strong sucking force for firmly attaching the sucker main body to a polished surface such as the outer surface of a car or a glass.

1 Claim, 3 Drawing Sheets

FIXING SUCKER STRUCTURE

BACKGROUND OF THE INVENTION

1. Technical Field of the Invention

The present invention relates to a fixing sucker structure, and more particularly to a sucker structure for fixing a sunshade tent or curtain on the surface of a car body or a glass. A movable handle is used to control the strength of the sucking force so as to firmly attach the sucker structure to the outer surface of the car. After it has been fixed, the movable handle can be removed so as to prevent an unauthorized person from stealing the sucker structure.

2. Prior Art

A conventional fixing sucker structure of car-used sunshade tent is made of soft rubber material and formed as a dish. When subject to high temperature, such sucker structure tends to detach from the surface of the car body or the windshield. Especially, when applied to outer surface of the car, the sucker structure is apt to be blown away by wind or taken away by an unauthorized person.

SUMMARY OF THE INVENTION

It is therefore a primary object of the present invention to provide a fixing sucker structure which is able to firmly suck and attach to outer surface of a car body or a glass so as to reliably fix a car-used sunshade tent over the car body.

The present invention can be best understood through the following description and accompanying drawings, wherein:

DETAILED DESCRIPTION OF THE PREFERRED EMBODIMENT

Figure 1:
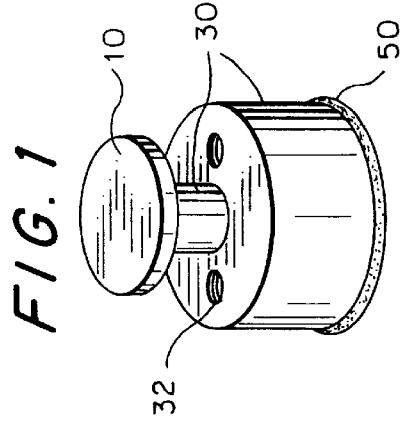
FIG. 1 is a perspective assembled view of the present invention.
Figure 4A:
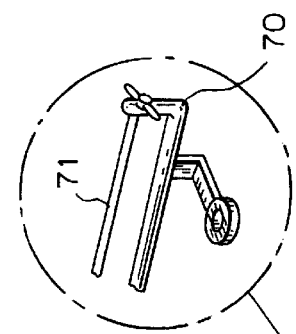
FIG. 4A is an enlarged portion of FIG. 4.
Figure 4:
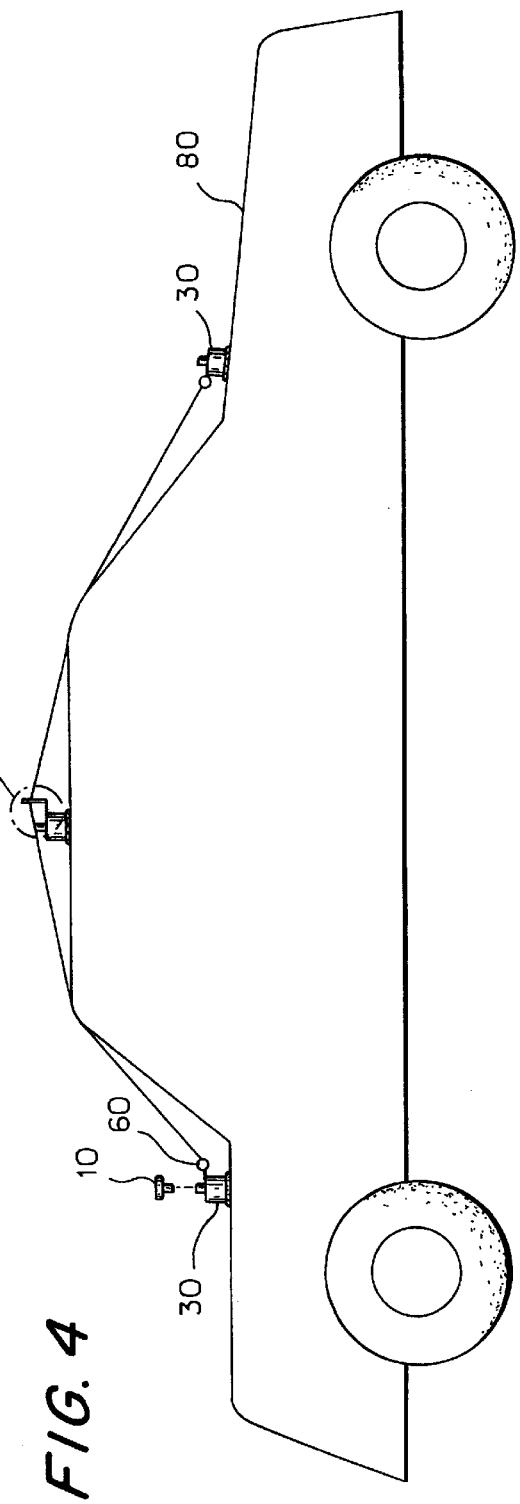
FIG. 4 shows the application of the present invention.
Figure 2:
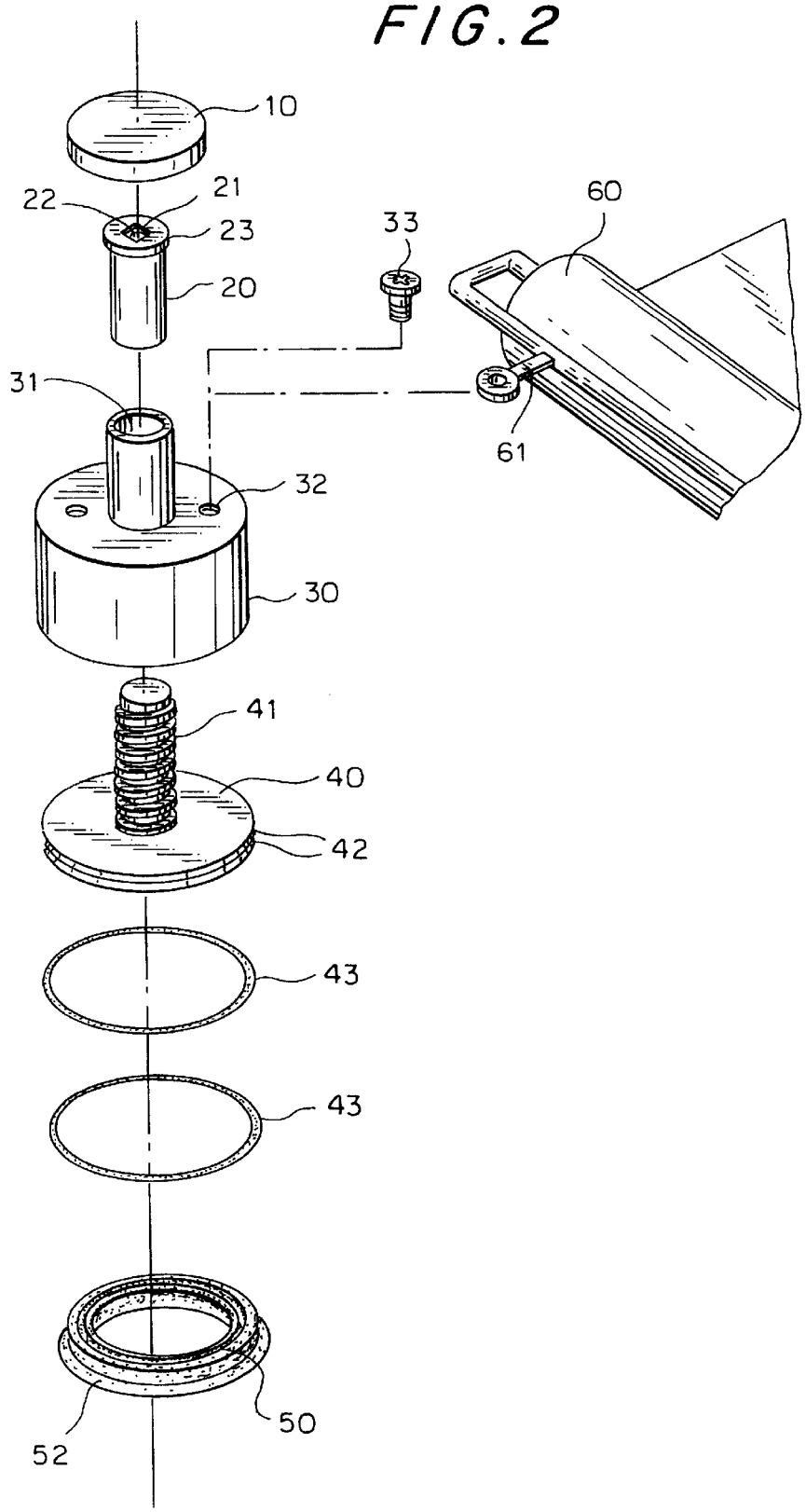
FIG. 2 is a perspective exploded view of the present invention.
Figure 3:
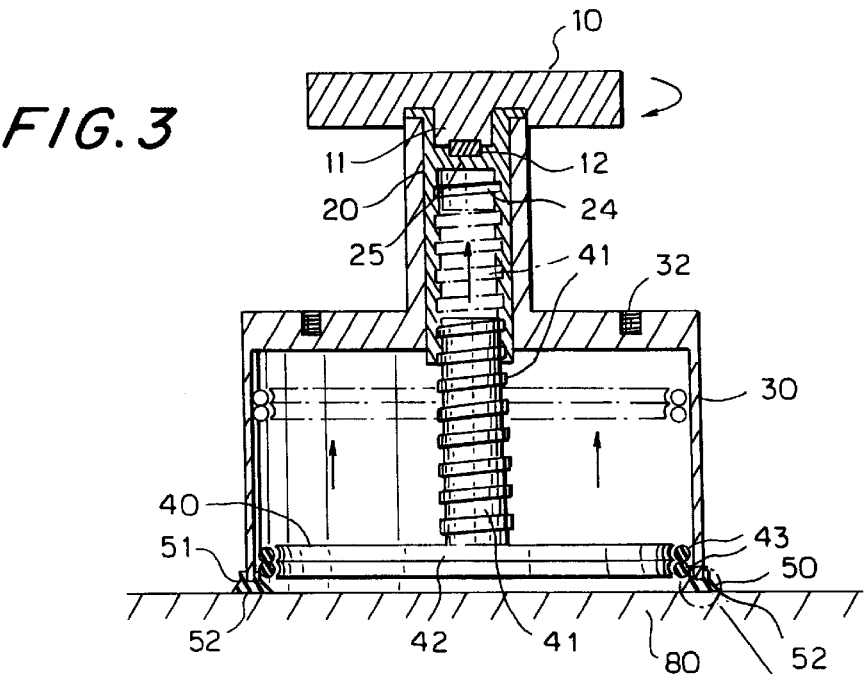
FIG. 3 is a sectional assembled view of the present invention, showing the operation thereof.
Figure 3D:
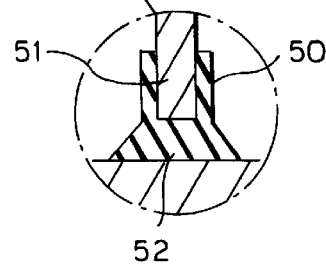
FIG. 3D is an enlarged view of the U-shaped gasket of the present invention.
Figure 3A:
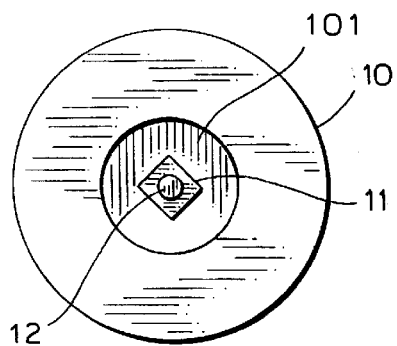
FIG. 3A is a bottom view of the movable handle of the present invention.
Figure 3B:
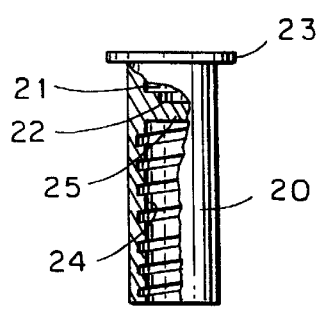
FIGS. 3B and 3C are respectively a sectional view and top view of the controlling inner tube of the present invention.
Figure 3C:
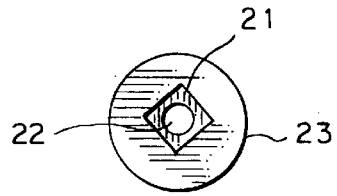

Please refer to FIGS. 1 and 2. The present invention includes a movable handle 10, a controlling inner tube 20 fitted in a central tube body 31 at top end of a sucker main body 30, a lifting thread rod 41 fitted in the sucker main body 30 and screwed with the controlling inner tube 20 and a disc-like enlarged section 40 connected with a bottom end of the lifting thread rod 41. The circumference of the enlarged section 40 is formed with two annular grooves 42 in which two soft gaskets 43 are fitted. In addition, a gasket 50 having a U-shaped cross-section is fitted onto the bottom edge of the sucker main body. Please refer to FIG. 3. The center of the bottom of the movable handle 10 is disposed with an annular fitting groove 101 and a square controlling valve 11 is disposed at the center of the fitting groove 101. The bottom end of the controlling valve 11 is disposed with a downward extending cylindrical fixing block 12 (referring to FIG. 3A). In addition, the upper end of the controlling inner tube 20 is formed with an engaging flange 23 (as shown in FIG. 3B). The upper opening of the controlling inner tube 20 is formed with a controlling valve socket 25 having a square section 21 and a circular fixing hole 22 formed at the center of the bottom of the socket 25. The inner wall of the controlling inner tube 20 below the socket 25 is formed with an inner thread section 24 for screwing with the lifting thread rod 41. The top end of the sucker main body 30 is formed with two fixing thread holes 32. The U-shaped gasket 50 engages edge 51 of main body 30 and has a trapezoid base 52. According to the above arrangement, when the sucker main body sucks and attaches to a polished surface, the sucker main body can more tightly attach to the surface without detachment (referring to FIG. 3D). With the above structure (referring to FIG. 3), when the movable handle 10 is clockwisely rotated with the controlling valve 11 fitted in the socket 25 of the controlling inner tube 20, the controlling inner tube 20 is driven to clockwisely rotate so as to micro-adjust and drive the lifting thread rod 41 to move upward. The disc-like enlarged section 48 of the lifting thread rod 41 is tightly engaged with the inner wall of the sucker main body 30, whereby a sealed vacuum space is defined between the enlarged section 40 and polished surface 80 of a car to create a strong sucking force, enabling the sucker main body to firmly suck and attach to the surface without detachment. Please refer to FIG. 4 which shows the application of the present invention. First, the fixing rod 61 of a car-used sunshade tent 60 is locked with the sucker main body 30 by fixing screws 33 screwed into the fixing thread holes 32 of the sucker main body 10. Then the sucker rain body 30 is attached to the outer polished surface of the car by sucking. In addition, the middle supporting rod 70 is also locked on the sucker main body 30 and fixed on the roof of the car. The other end of the sunshade tent 60 is locked on the sucker main body 30 and passed through the space between the supporting rod 70 and an elastic fastening belt 71 and then fixed at the other end of the car. After the sunshade tent is fixed on the car, a user can extract the handle 10 from the sucker main body 30. Accordingly, a strong vacuum sucking force is created to tightly attach the sucker main body to the surface of the car even when subject to a manually pulling force. Therefore, the sunshade tent is prevented from missing or being stolen.

The above description and accompanying drawings are only used to illustrate one embodiment of the present invention. Any modification or variation derived from the embodiment should fall within the scope of the present invention.

What is claimed is:

1. A fixing sucker structure comprising a movable handle, a sucker main body, a controlling inner tube and a lifting thread rod, said sucker structure being characterized in that:

a center of the bottom of the movable handle is disposed with an annular fitting groove, a square controlling valve being disposed at the center of the fitting groove, a bottom end of the controlling valve being disposed with a downward extending cylindrical fixing block, the cylindrical fixing block being rotatably snugly fitted in a controlling valve socket of the controlling inner tube;

a center of a top end of the sucker main body is disposed with a tube body, the top end of the sucker main body being formed with fixing thread holes, the controlling inner tube being rotatably fitted in the tube body, a gasket having a U-shaped cross-section being fitted with a bottom edge of the sucker main body, the gasket having a trapezoid base;

an upper end of the controlling inner tube is formed with an engaging flange, whereby the controlling inner tube is rotatably sealedly fitted in the tube body of the sucker main body, an opening of the controlling inner tube being formed with the controlling valve socket having a profile corresponding to that of the controlling valve of the movable handle, an inner wall of the controlling inner tube below the socket being formed with an inner thread section for screwing with the lifting thread rod; and a bottom end of the lifting thread rod is connected with a disc-like enlarged section, a circumference of the enlarged section being formed with annular grooves in which soft gaskets are fitted, whereby when the movable handle is rotated, the controlling inner tube is driven to rotate so as to micro-adjust and drive the lifting thread rod to move upward or downward within the sucker main body, creating a vacuum state therein and producing a strong sucking force.

* * * * *